April 12, 1960   B. B. KORN   2,932,252
RING ASSEMBLY QUICK DISCONNECT NOSE
Filed July 1, 1957   3 Sheets-Sheet 1

BERNARD B. KORN,
INVENTOR

BY
*F. Munro Redman*

ATTORNEY

April 12, 1960  B. B. KORN  2,932,252
RING ASSEMBLY QUICK DISCONNECT NOSE

Filed July 1, 1957  3 Sheets-Sheet 2

BERNARD B. KORN,
INVENTOR

BY
ATTORNEY

April 12, 1960  B. B. KORN  2,932,252
RING ASSEMBLY QUICK DISCONNECT NOSE
Filed July 1, 1957  3 Sheets-Sheet 3

BERNARD B. KORN,
INVENTOR

BY *F. Munns Redman*

ATTORNEY

United States Patent Office 2,932,252
Patented Apr. 12, 1960

2,932,252

RING ASSEMBLY QUICK DISCONNECT NOSE

Bernard B. Korn, Los Angeles, Calif., assignor to Hughes Aircraft Company, Culver City, Calif., a corporation of Delaware Application July 1, 1957, Serial No. 669,914

4 Claims. (Cl. 102—49)

This invention relates to guided missiles, and particularly to an improved mechanism for removably locking separable sections together.

The embodiment herein described permits assembly and disassembly by merely sliding adjacent sections together, or pulling them apart, longitudinally, without requiring relative rotation of the sections.

It is a common practice in the field of guided missiles to build such a device in a plurality of sections, each containing specialized equipment of a certain type, with the several sections fixed together to form a complete unit.

In one such missile, for example, the nose portion consists of a radome, with additional sections containing the guidance mechanism proper, the war head or explosive load, and the propelling mechanism.

The electronic equipment contained within the section devoted to the systems for guiding the missile in flight must be readily available for inspection and maintenance. This requires disconnecting the section from the other units in order to obtain access to the components. In the prior art, use has been made of means such as mating screw threads on the radome and the housing portions. These screw threads have been made of relatively fine pitch and have been machined with extreme accuracy. The result has been that after assembling and disassembling a missile several times, a relatively high percentage of missile portions have had to be discarded, due to mechanical failure of the coupling. This failure may take the form of jammed or stripped threads, resulting in an inability on the part of the maintaining personnel to couple the sections together. In other cases, the threads have jammed after assembly, so that it has been impossible to disassemble the missile. This presents a situation dangerous to personnel, particularly in handling or disposing of "live" missiles, in which servicing of the control mechanism may be necessary. In any case, the substantial mass of the units makes a requirement for extreme care in manipulating the sections undesirable.

It is, therefore, an object of the present invention to provide a structure for insuring the close cooperation of each of the various missile sections with the adjacent sections containing the electronic control mechanisms and other elements.

Another object is to improve the ease and rapidity with which missiles may be dismantled for service and thereafter reassembled.

Still another object is to reduce the hazards to personnel in handling "live" missiles requiring adjustment or service.

These and other objects will be apparent from the detailed description following in connection with the drawings in which.

Figure 1:
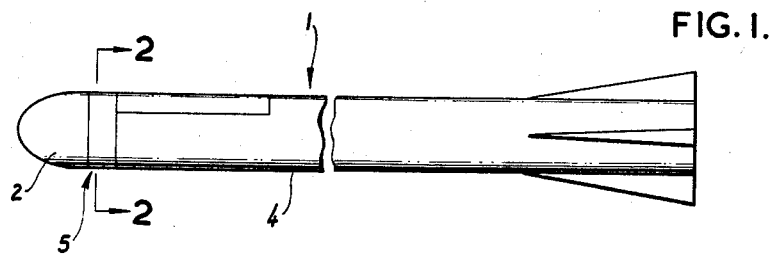
Fig. 1 is a side elevational view of a device with which the invention is to be utilized.
Figure 2:
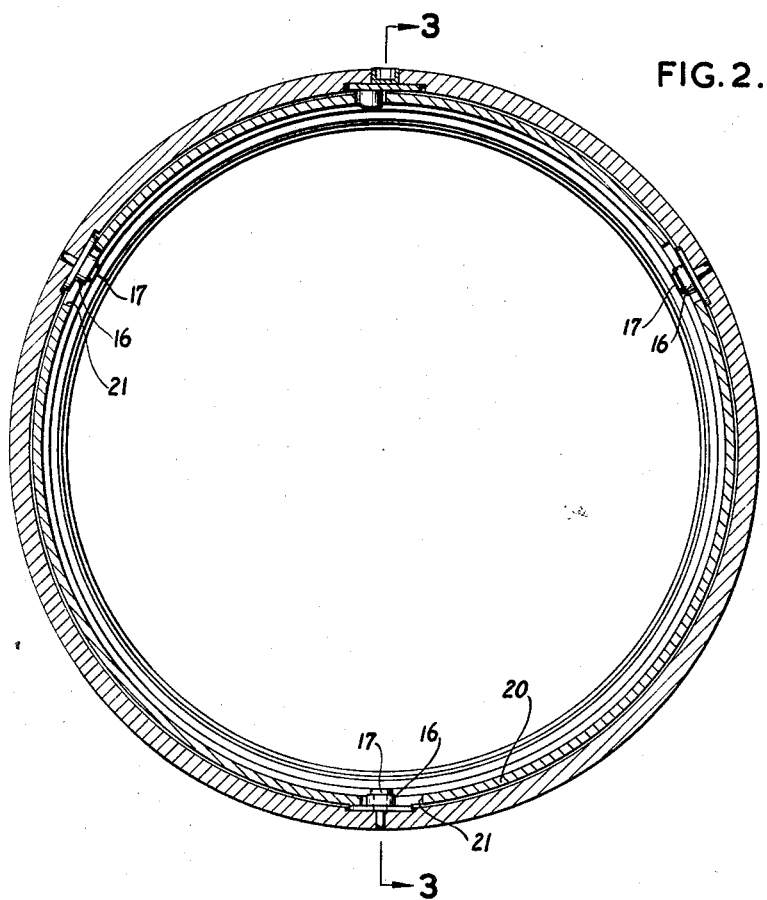
Fig. 2 is a transverse sectional view taken as indicated by line 2—2 of Figs. 1 and 3.
Figure 3:
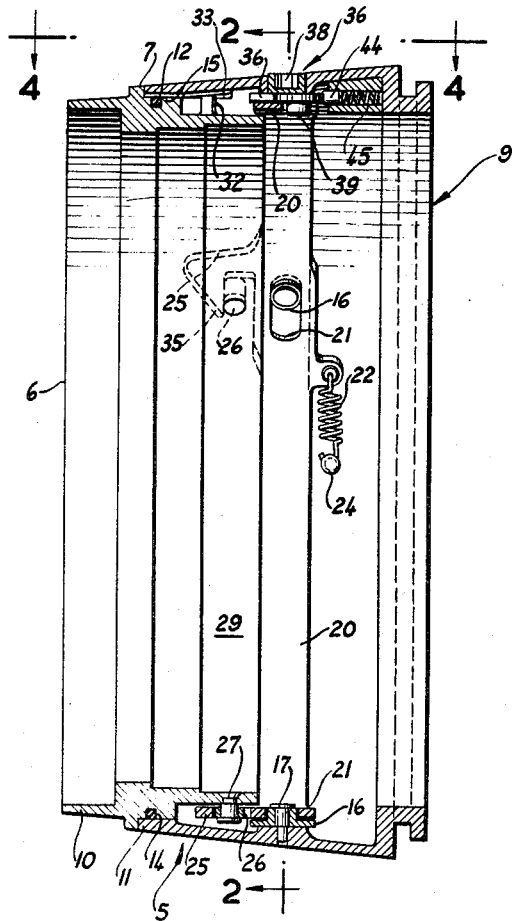
Fig. 3 is a longitudinal sectional view taken as indicated by line 3—3 of Fig. 2, to show in detail the elements of the invention.

The fuselage may also contain an explosive load or war head, not shown. The fuselage may be divided into additional longitudinal segments, not illustrated, by the use of additional locking ring means similar to those described in detail hereafter. The locking ring means 5 are shown in a transverse sectional view in Fig. 2, and in a longitudinal sectional view in Fig. 3. The locking ring consists basically of two annular aluminum pieces secured removably together by the locking means described in detail hereafter. A forward ring 6 is provided with an annular external flange 7 exactly to position the radome and the rear ring 9. On the forward ring 6 and ahead of the annular external flange 7, is formed a frusto conical radome seat 10, over which the plastic radome 2 is fitted snugly and to which it may be secured by conventional means. Against the rearwardly facing side of the flange 7, is snugly fitted an engaging flange 11 formed on the forward end of the rear ring 9.

A snug fit is obtained between the forward ring 6 and the forward end 11 of rear ring 9 and the O-ring 12 is suitably seated in a peripheral groove 14 formed in the seating surface 15 of rear ring 9, adjacent to flange 7. The combination of a snug fit and the O-ring 12 at this point maintains the device substantially hermetically sealed in this area.

The rear ring 9 is mounted therein on a plurality of bosses extending inwardly and a number of symmetrically spaced roller members 16. Roller members 16 may be rotatably mounted on studs 17 fixed to the rear ring 9.

An annular locking member 20 is provided within the rear ring 9. Annular locking member 20 has a plurality of apertures 21 formed therein of sufficient width to permit the entrance thereinto of the rollers 16, and of sufficient length to permit the annular locking member 20 to be rotated for a short distance about the axis of the missile. Normally, the annular locking member 20 is resiliently held in a particular position by a plurality of springs 22 fixed thereto at one end, and anchored at their opposite ends 24 to the rear ring 9. Springs 22 are resilient enough to permit rotation of the annular locking member 20 about its annular axis when the nose portion is being assembled thereto, but will return annular locking member 20 to its locking position as soon as the locking position has been reached.

Locking of the rear ring 9 to the forward ring 6 is effected by the engagement of hook-shaped locking arms 25 formed integrally with and extending forwardly from the annular locking member 20, with locking rollers 26 rotatably secured to the forward ring 6 by radial studs 27 or equivalent means. The radial studs 27 are fixed as by riveting or other conventional means, in the rear skirt 29 of forward ring 6, and extend radially outward therefrom. The rear skirt 29 is sufficiently smaller in diameter to enable the locking member 20 to simultaneously engage the locking rollers 16 extending inwardly from the rear member 9, and to permit the locking arms 25 to engage the locking rollers 26 extending rotatably outwardly from the rear skirt 29 of the forward ring 6.

The locking arm 25 is provided with a locking groove 30, the forward portion 31 of which is tapered about three degrees so that it is slightly wider at this open end than at the bottom end of the groove 30. This enables the locking arms 25 to draw the forward ring 6 tightly against the annular external flange 7 during the assembly of the units.

Figure 6:
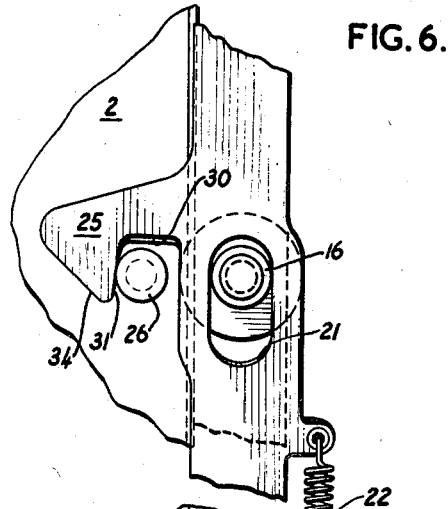
Fig. 6 is a schematic fragmentary view of a portion of the locking mechanism of the invention, shown in locked position.
Figure 7:
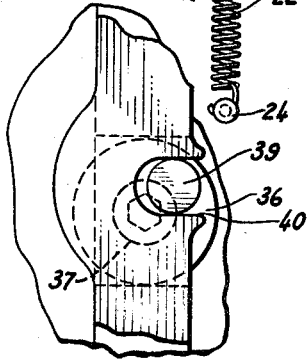
Fig. 7 is a schematic fragmentary view of the means for controlling the locking mechanism.
Figure 8:
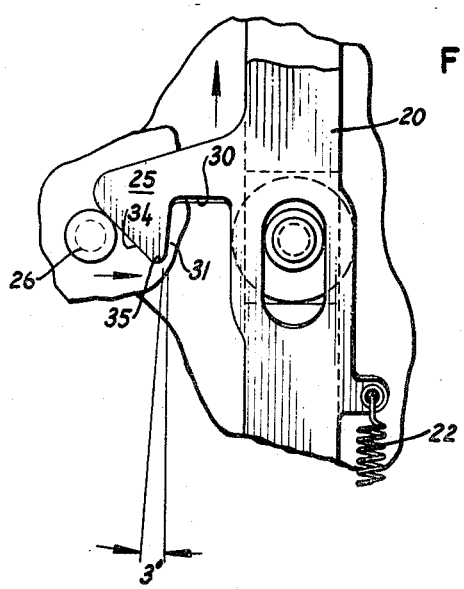
Fig. 8 is a schematic fragmentary view similar to that of Fig. 6, but showing the locking parts in an early stage of engagement leading to the locking position.

During such assembly, the nose 2 is pushed into position, without rotating it about the axis of the unit. It is guided by an indexing pin 32 formed on the forward unit 6 and a cooperating keyway 33, formed in the rear unit 9. A camming surface 34 is formed on the forward face of the locking arm 25. As the nose portion 2 is pushed toward the fuselage, the locking rollers 26 may strike against the camming surface 34, as shown in Fig. 8. As pressure is continued, this will cause the locking ring 20 to rotate about the longitudinal axis of the units, until the roller passes the tip 35 of the locking arm. Once the rollers 26 have passed the tip 35, springs 22 will act to rotate the locking member 20 back to its normal locking position. This will draw the rollers 26 into the locking position shown in Fig. 6.

When it is desired to remove the nose section 2 from the fuselage 4, the locking member 20 is rotated about its annular axis through the instrumentality of a cam member generally indicated as 36, which may be seen in Figs. 2, 3, 4 and 7. Cam member 36 consists of a cam plate 37 rotatably mounted in the rear ring 9 and having an externally actuatable engaging head 38 which may be, for example, made of the well known Allen-head type. Extending inwardly from the cam plate 37 is a roller 39 mounted eccentrically relative to the cam member 36. Roller 39 engages within a slot 40 formed in and transversely of the locking member 20, so that as the member 36 is rotated, the eccentrically mounted roller 39 will force the locking member 20 to rotate about its annular axis sufficiently to bring the locking rollers 26 past the locking tip 35 of the locking arms 25 so that the nose 2 may then be removed by a straight pull axially of the missile.

The circumference of cam plate 37 has formed therein two locking recesses 41 and 42, which are engageable by a detent pin 44 under the urging of a spring 45 mounted in the rear ring 9. This prevents the accidental actuation of the releasing mechanism.

Figure 5:
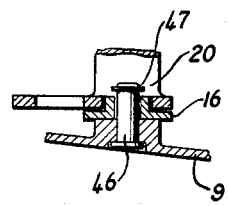
Fig 5 is a fragmentary view partially in section of a detail of an alternative construction.
Figure 4:
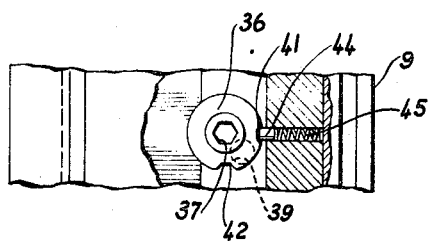
Fig. 4 is a fragmentary view partially in section, taken as indicated by line 4—4 of Fig. 3.

An alternative construction is shown in Fig. 5 for the mounting of the rollers 16, which retain the locking ring 20 in position. In this embodiment, the rollers 16 are held by studs 46 inserted externally through the rear ring 9, and held in place by locking washers 47 within the device.

It will thus be seen that a spring-loaded structure has been provided which will tend to tighten the various sections together as the entire assembly undergoes vibration.

What is claimed is:

1. In a device having a generally cylindrical body formed in a plurality of transversely divided sections, means for removably joining said sections together, comprising: a first annular member secured to a forward one of said sections; a second annular member secured to a rearward one of said sections; indexing means associated with the rearward one of said section; an indexing groove formed in the forward one of said sections and arranged slidably to receive said indexing means; a plurality of symmetrically spaced supporting means extending inwardly from the said second annular member; an annular locking ring disposed within the forward portion of said second annular member and within the rearward portion of said first annular member, said locking ring having a plurality of slots arranged to receive said symmetrically spaced supporting means associated with said second annular member for limited rotation of said locking member about the longitudinal axis of said body; resilient means anchored to said second annular member for urging said locking ring toward a locking position; a plurality of symmetrically disposed locking cams extending forwardly from said annular locking ring and arranged to receive locking members associated with said first annular member; a plurality of locking members extending from said first annular member and arranged to cooperate with said locking cams; an externally actuatable eccentric member rotatably mounted in said second annular member and arranged to cooperate with said annular locking ring to induce rotation thereof in an unlocking direction, and spring-loaded detents associated with said eccentric member arranged to hold said locking ring in locked and in unlocked position.

2. In a device having a nose section and a fuselage section of a generally cylindrical cross section, means for joining said sections removably together, comprising: a first annular member secured to said nose section; a second annular member secured to said fuselage section; indexing pin means associated with one of said sections; an indexing groove formed in the other of said sections and arranged to receive said indexing pin means slidably in a direction parallel to the longitudinal axis of said device; a plurality of symmetrically spaced supporting members extending inwardly from the forward portion of said fuselage section and having engaging rollers mounted thereon; an annular locking ring disposed within the forward portion of said fuselage section and within the rearward portion of said nose section; a plurality of slots formed in said locking ring transversely of the axis of said device, said slots being arranged to receive said engaging rollers and supporting means for limited rotation of said ring about the longitudinal axis of said device; resilient means anchored to said fuselage section and to said locking ring for urging said ring toward locking position; a plurality of symmetrically disposed locking cams formed integrally with, and extending forwardly from, said annular locking ring; a plurality of locking members having rollers mounted thereon extending inwardly from said nose section and arranged to be lockingly engaged by said slotted locking cams when said ring is turned in a locking direction; an exteriorly actuatable eccentric member mounted in said fuselage section rotatably about an axis perpendicular to a longitudinal axis of said device; a slot formed transversely of said annular locking ring and arranged to receive said eccentric member, whereby said annular member may be forced in a direction opposite to the locking direction; and spring-loaded detents associated with said eccentric member and arranged to detain said eccentric in locked and in unlocked positions relative to said annular locking ring.

3. In a device having a nose section and a plurality of fuselage sections of generally cylindrical cross section, means for removably joining said sections together, comprising: a first annular member fixed to the rear end of the forward one of each pair of said sections to be joined together; a second annular member secured to the rear end of each of said pairs of sections to be joined together; an annular locking ring arranged to cooperate with said first and second annular members for the removable locking together thereof; indexing pin means associated with one of the adjacent ends of each of the pairs of sections to be joined together; the cooperating indexing groove formed in the end of the section adjacent thereto and arranged to align said sections by longitudinal sliding action with said indexing pin means; a plurality of symmetrical supporting means extending inwardly from the rearward one of said sections; rotatable engageable means mounted on each of said supporting means, and; a plurality of transverse slots formed in said locking ring and arranged to receive said rotatable engaging means for limited rotation about the axis of said device; slotted cam members formed integrally with, and extending forwardly from, said annular locking ring element; cam-member-engaging rollers rotatably mounted within the rear position of each of said sections and arranged to engage said slotted cam members and first to rotate said locking ring into a position permitting locking, and thereafter to effect locking action; externally actuatable eccentric means for engaging said locking ring to induce rotation thereof in an unlocking direction about the axis of said device; and spring-loaded detents associated with said eccentric member for holding said member in an unlocked and in a locked position of said locking ring.

4. In a guided missile assembly having a plurality of separable longitudinal sections, means for securing said sections removably to each other, comprising: a first annular member fixed to the rear end of the forwardly disposed one of each adjacent pair of said sections; a second annular member fixed to the forward end of the next rearwardly adjacent one of said sections; an annular locking ring member disposed in cooperative relationship with said first and said second annular members, said locking ring member having a plurality of slots formed transversely of the axis of said missile assembly and having a single slot formed therein parallel to said axis; means cooperating with said single slot and actuatable externally of said missile for rotating said locking ring about the axis of said missile; resilient means anchored to one of said annular members and to said annular locking ring for urging said ring in a locking direction; locking studs extending inwardly from the forward one of said sections; cammed engaging arms extending from said locking ring and engageable with said locking studs, said camming members having slots therein with engaging surfaces formed at an angle on the order of three degrees to a plane normal to the axis of said missile; and detent means arranged to hold said locking ring in a locked and in an unlocked position.

References Cited in the file of this patent
UNITED STATES PATENTS

| | | |
|---|---|---|
| 426,824 | Leland | Apr. 29, 1890 |
| 2,660,456 | Meddock | Nov. 24, 1953 |